(12) United States Patent
Chiu et al.

(10) Patent No.: US 8,886,884 B2
(45) Date of Patent: Nov. 11, 2014

(54) SYSTEM AND METHOD FOR INCREASING READ AND WRITE SPEEDS OF HYBRID STORAGE UNIT

(75) Inventors: Yu-Ting Chiu, Taipei (TW);
Chih-Liang Yen, Taipei (TW);
Cheng-Wei Yang, Taipei (TW)

(73) Assignee: Waremax Electronics Corp., Taipei (TW)

( * ) Notice: Subject to any disclaimer, the term of this patent is extended or adjusted under 35 U.S.C. 154(b) by 266 days.

(21) Appl. No.: 13/590,370

(22) Filed: Aug. 21, 2012

(65) Prior Publication Data

US 2013/0060999 A1    Mar. 7, 2013

(30) Foreign Application Priority Data

Sep. 1, 2011    (TW) .............................. 100131492 A

(51) Int. Cl.
*G06F 12/00*    (2006.01)
*G06F 12/08*    (2006.01)

(52) U.S. Cl.
CPC ........ *G06F 12/0873* (2013.01); *G06F 12/0862* (2013.01); *G06F 12/0802* (2013.01); *G06F 12/0866* (2013.01); *G06F 2212/217* (2013.01)
USPC .......................................................... 711/118

(58) Field of Classification Search
CPC ............ G06F 12/0802; G06F 12/0866; G06F 12/0862
See application file for complete search history.

(56) References Cited

U.S. PATENT DOCUMENTS 6,567,889 B1 *    5/2003    DeKoning et al. ............. 711/114

* cited by examiner

*Primary Examiner* — Matthew Bradley
*Assistant Examiner* — Craig Goldschmidt
(74) *Attorney, Agent, or Firm* — Bacon & Thomas, PLLC

(57) ABSTRACT

The present invention is to provide a system for increasing read and write speeds of a hybrid storage unit, which includes a cache controller connected to the hybrid storage unit and a computer respectively, and stores forward and backward mapping tables each including a plurality of fields. The hybrid storage unit is composed of at least one regular storage unit (e.g., an HDD) having a plurality of regular sections corresponding to forward fields respectively, and at least one high-speed storage unit (e.g., an SSD) having a plurality of high-speed storage sections corresponding to backward fields respectively with higher read and write speeds than the regular storage unit. The cache controller can make the high-speed storage section corresponding to each backward field correspond to the regular section corresponding to the forward field, thus allowing the computer to rapidly read and write data from and into the hybrid storage unit.

15 Claims, 14 Drawing Sheets

SYSTEM AND METHOD FOR INCREASING READ AND WRITE SPEEDS OF HYBRID STORAGE UNIT

FIELD OF THE INVENTION

The present invention relates to an electronic storage system, more particularly to a system for increasing the read and write speeds of a hybrid storage unit, which has a cache controller respectively and electrically connected to the hybrid storage unit and a computer. The cache controller can utilize a forward mapping table and a backward mapping table stored in the system to allow the computer to read and write data rapidly from and into high-speed storage sections of the hybrid storage unit.

BACKGROUND OF THE INVENTION

With the rapid development of microelectronic technology, computer peripherals have been substantially improved and highly diversified. Nowadays, computers are used not only for word processing and web browsing, but also for the users to enjoy the replay of high-quality audio and video files, play online 3D games, or execute complicated application programs. As the sizes of files, be they high-quality audio/video files or other digital data files, must increase with the degree of data complexity and precision, high-capacity hard disks have been essential to almost all computer products.

Currently, a hard disk drive (HDD) can store up to several terabytes of electronic data, but the mechanical structure of such an HDD makes it difficult to increase its read and write speeds to levels comparable to those of a central processing unit (CPU). Moreover, due to their high power consumption and low shock resistance, HDDs are not suitable for use in mobile electronic devices. In view of the above, the industry has conducted extensive research and development in search for new storage devices, among which solid-state disks, or solid-state drives, (SSDs) are the most promising. An SSD is a computer data storing device based on a non-volatile memory (e.g., a flash memory). The principle of the SSD technology is to form a storage device by connecting a plurality of memories (e.g., NAND memories) together in conjunction with an appropriate control chip and related circuits. In terms of specifications, most SSDs are manufactured in the same sizes as HDDs, the most common sizes being 1.8", 2.5", and 3.5", and this is because SSDs are typically used as a substitution for HDDs. As for the connection interface between an SSD and a computer, SATA2 is presently the most popular, but some SSDs use other connection interfaces such as IDE, SATA, SATA3, 1394, USB, and PCI-E. The memories for use in SSDs can be generally divided into two major categories: multi-level cell (MLC) and single-level cell (SLC); nevertheless, the newly developed triple-level cell (TLC) memory is also eligible. As far as current technology is concerned, MLC-based SSDs are less costly but have lower write speeds and shorter service lives than SLC-based SSDs.

In contrast to HDDs, SSDs are advantageous in that they produce no noise, have lower power consumption, are more resistant to shock during reading and writing, generate less heat, and can be more easily made lightweight; therefore, SSDs are perfect for use in portable electronic devices. In addition, according to test results, SSDs have read speeds approximately more than two to three times as high as those of HDDs and write speeds more than 1.5 times as high. Given that HDDs have become a bottleneck for system performance, SSDs are indeed a decent solution. However, due to the fact that the cost per megabyte of either a non-volatile memory or a volatile memory is far higher than that of an HDD, the lofty prices of high-capacity SSDs have made it impossible for an ordinary user to replace all the HDDs in use with SSDs.

As a solution, the hybrid drive emerged. The hybrid drive, based on a technology generally known as HDDBOOST, essentially includes a control device installed in a computer and respectively connected to an HDD and an SSD. By means of the control device, the computer can read data from either drive or simultaneously write data into both drives. While this technology can boost data read speed to some degree, its data writing process leaves much to be desired. More particularly, in order to achieve data synchronization between the HDD and the SSD, the control device is configured to write data into both drives at the same time, which, however, hinders significant improvement of the computer's overall performance.

As a hybrid drive is merely a hardware structure, a corresponding software or system is required for writing data correctly into or reading data out of the hybrid drive, and the related processes are critical to the performance of the hybrid drive. Hence, the issue to be addressed by the present invention is to design a system and method for increasing the read and write speeds of a hybrid drive.

BRIEF SUMMARY OF THE INVENTION

In view of the fact that the conventional hybrid drives lack a proper data processing method and thus fail to boost overall computer performance, the inventor of the present invention conducted extensive research and numerous trials based on years of practical experience and finally succeeded in developing a system and method for increasing the read and write speeds of a hybrid storage unit as disclosed herein. It is hoped that the present invention helps increase the efficiency and accuracy of hybrid storage units (e.g., hybrid drives) in general.

It is an object of the present invention to provide a system for increasing the read and write speeds of a hybrid storage unit. The system includes a computer, a hybrid storage unit, and a cache controller, among other devices. The system also stores a forward mapping table and a backward mapping table. These mapping tables can be stored in any device or devices in the system. The hybrid storage unit is composed of at least one regular storage unit and at least one high-speed storage unit, wherein the at least one high-speed storage unit (e.g., an SSD) has higher read and write speeds than the at least one regular storage unit (e.g., an HDD). The at least one regular storage unit is divided into a plurality of regular sections, and the at least one high-speed storage unit is divided into a plurality of high-speed storage sections. The forward mapping table includes a plurality of forward fields which correspond to the regular sections respectively. The backward mapping table includes a plurality of backward fields which correspond to the high-speed storage sections respectively. The cache controller is respectively and electrically connected to the hybrid storage unit and the computer. The cache controller can write a backward tag into each forward field, thus not only making each forward field correspond to one backward field, but also making the regular section corresponding to each forward field correspond to the high-speed storage section corresponding to the corresponding backward field. Or, the cache controller can write a forward tag into each backward field to make each backward field correspond to one forward field, thereby making the high-speed storage section corresponding to each backward field correspond to the regular section corresponding to the corresponding forward field. As such, the mapping tables and the tags enable the regular sections and the high-speed storage sections to correspond respectively to each other, thus allowing the computer to read and write data from and into the hybrid storage unit via the cache controller.

It is another object of the present invention to provide a method for increasing the read and write speeds of the aforesaid hybrid storage unit, wherein the method includes a writing process performed by the cache controller. The writing process includes the steps of: receiving a writing command and, according to the writing command, identifying the regular section into which data are to be written; determining whether the forward field of the forward mapping table that corresponds to the regular section already has a backward tag written therein; and, if yes, writing the data into the high-speed storage section corresponding to the backward tag or, if not, writing the data into an unused high-speed storage section in the at least one high-speed storage unit and updating the forward mapping table and the backward mapping table. According to this method, the cache controller writes data preferentially into the at least one high-speed storage unit so that the computer can take advantage of the high-speed writing feature of the at least one high-speed storage unit and operate with high efficiency.

Yet another object of the present invention is to provide the foregoing method, wherein the method further includes a reading process performed by the cache controller. The reading process includes the steps of: receiving a reading command and, according to the reading command, identifying the regular section from which data are to be read; determining whether the forward field of the forward mapping table that corresponds to the regular section already has a backward tag written therein; and, if yes, searching for the corresponding high-speed storage section according to the backward tag and reading the data in the high-speed storage section or, if not, reading the data in the regular section, sending the data respectively to the computer and an unused high-speed storage section in the at least one high-speed storage unit, and updating the forward mapping table and the backward mapping table.

Still another object of the present invention is to provide the foregoing method, wherein the method further includes a mirroring process performed by the cache controller when not receiving a reading command or a writing command. More specifically, the cache controller determines whether the data stored in each regular section match the data stored in the corresponding high-speed storage section. If the data stored in any regular section do not match the data stored in the corresponding high-speed storage section, the cache controller mirrors the data stored in the high-speed storage section to the corresponding regular section to ensure that the data in each regular section match the data in the corresponding high-speed storage section.

BRIEF DESCRIPTION OF THE SEVERAL VIEWS OF THE DRAWINGS

The technical features and objects of the present invention, as well as the means adopted by the present invention to achieve such objects, will be best understood by referring to the following detailed description of some illustrative embodiments in conjunction with the accompanying drawings, in which.

DETAILED DESCRIPTION OF THE INVENTION

Figure 1:
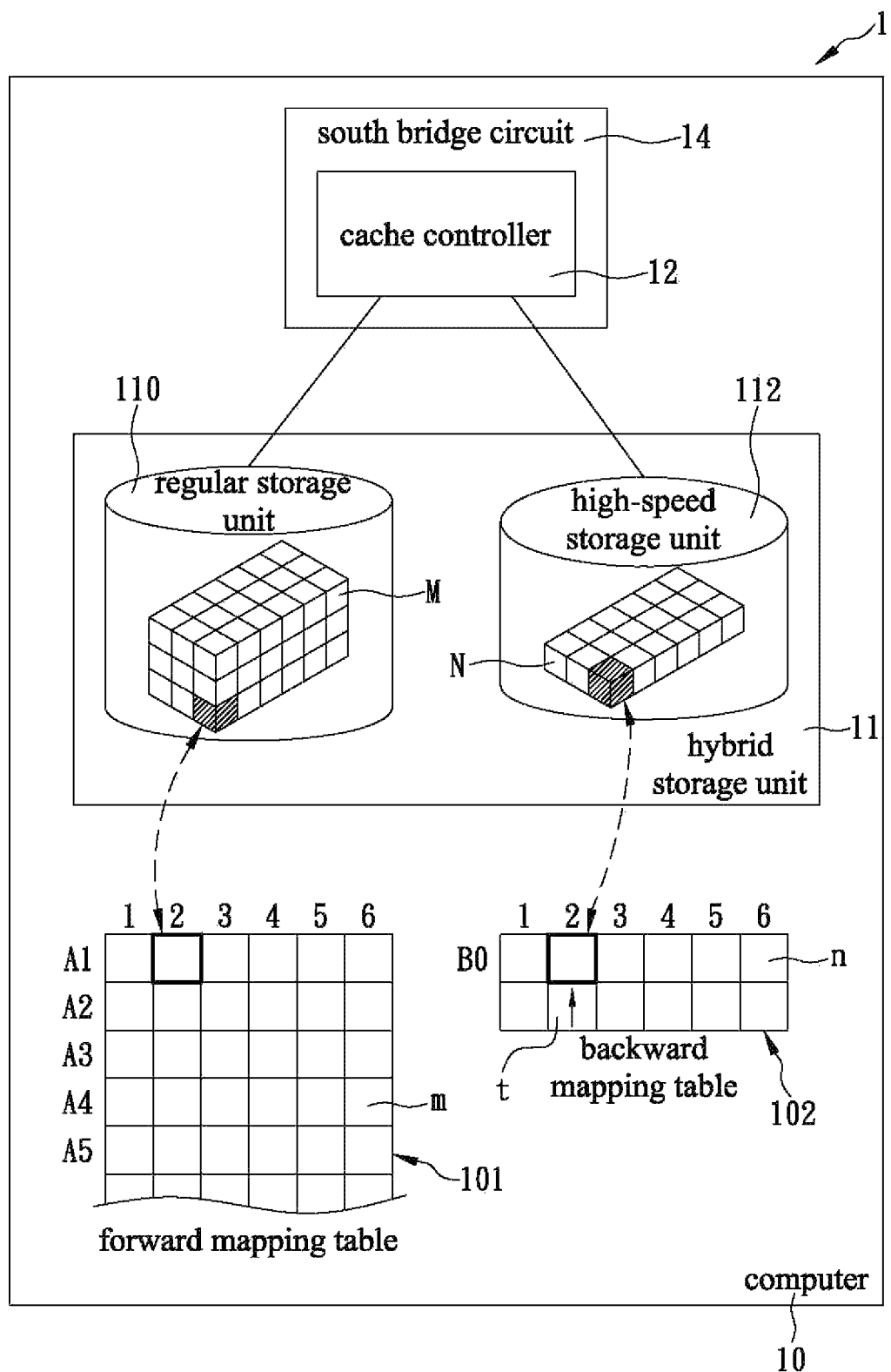
FIG. 1 is a schematic drawing of the system according to the first preferred embodiment of the present invention.

The present invention relates to a system and method for increasing the read and write speeds of a hybrid storage unit. Referring to FIG. 1 for the first preferred embodiment of the present invention, the system 1 includes a computer 10, a hybrid storage unit 11, and a cache controller 12, among other devices. In addition, the system 1 stores a forward mapping table 101 and a backward mapping table 102, wherein the mapping tables 101 and 102 can be stored in any device or devices in the system 1 (e.g., both mapping tables stored in the computer 10; or one stored in the hybrid storage unit 11, and the other, in the cache controller 12). The hybrid storage unit 11 is composed of a regular storage unit 110 and a high-speed storage unit 112. The regular storage unit 110 and the high-speed storage unit 112 are storage devices of different types (e.g., HDD, SSD, disk array, flash memory module, SDRAM memory module (DDR/DDR2/DDR3), Magneteoresistive Random Access Memory (MRAM) memory module, and so forth), and the high-speed storage unit 112 has a higher read speed and a higher write speed than the regular storage unit 110 (e.g., the regular storage unit 110 being an HDD, and the high-speed storage unit 112, an SSD; or the regular storage unit 110 being a disk array, and the high-speed storage unit 112, an SDRAM memory module; or the regular storage unit 110 being an HDD, and the high-speed storage unit 112, a flash memory module; or the regular storage unit 110 being an SSD, and the high-speed storage unit 112, an SDRAM memory module; or the regular storage unit 110 being a disk array, and the high-speed storage unit 112, an MRAM memory module). The cache controller 12 is respectively and electrically connected to the computer 10 and the hybrid storage unit 11. The cache controller 12 can control the data writing process and data reading process of the system 1 by way of the forward mapping table 101 and the backward mapping table 102, with a view to increasing the read and write speeds of the hybrid storage unit 11.

Referring again to FIG. 1, the regular storage unit 110 is divided into a plurality of regular sections M, and the high-speed storage unit 112 is divided into a plurality of high-speed storage sections N. The forward mapping table 101 includes a plurality of forward fields m, wherein each forward field m corresponds to one regular section M. Similarly, the backward mapping table 102 includes a plurality of backward fields n, wherein each backward field n corresponds to one high-speed storage section N. In this embodiment, the forward mapping table 101 and the backward mapping table 102 are each vertically and horizontally labeled with a plurality of reference codes (i.e., A1, A2, B0, 1, 2, 3, etc.). Based on these reference codes, each forward field m and each backward field n correspond to a forward tag and a backward tag respectively. For instance, in FIG. 1, the forward field m surrounded by a thick black frame corresponds to the reference codes A1 and 2 and therefore corresponds to the forward tag A12. Likewise, the backward field n surrounded by a thick black frame corresponds to the reference codes B0 and 2 and therefore corresponds to the backward tag B02.

It should be pointed out that a common physical storage element (i.e., the regular storage unit 110 and the high-speed storage unit 112) is composed of a plurality of the smallest logical access units (e.g., each logical access unit being 512 bytes) arranged in a linear manner. In the present invention, each of the storage units 110 and 112 is divided into a plurality of linearly arranged sections, each section having a size equal to a plurality of the smallest logical access units, and the corresponding mapping tables 101 and 102 are generated accordingly. The mapping tables are illustrated in FIG. 1 as having vertical reference codes and horizontal reference codes for the sole purpose of enabling intuitive comprehension of the technical features of the present invention.

Referring to FIG. 1, each forward field m may have a backward tag written therein so as to correspond to a backward field n. This also makes the regular section M corresponding to each forward field m correspond to the corresponding backward field n and hence the corresponding high-speed storage section N. Alternatively, each backward field n may have a forward tag written therein so as to correspond to a forward field m, thus making the high-speed storage section N corresponding to each backward field n correspond to the corresponding forward field m and hence the corresponding regular section M. In FIG. 1, for example, the forward field m corresponding to the forward tag A21 may have the backward tag B01 written therein; thus, with the backward tag B01 corresponding to a particular backward field n, the regular section M corresponding to the aforesaid forward field m is associated with the high-speed storage section N corresponding to this particular backward field n by virtue of the mapping tables.

Figure 2A:
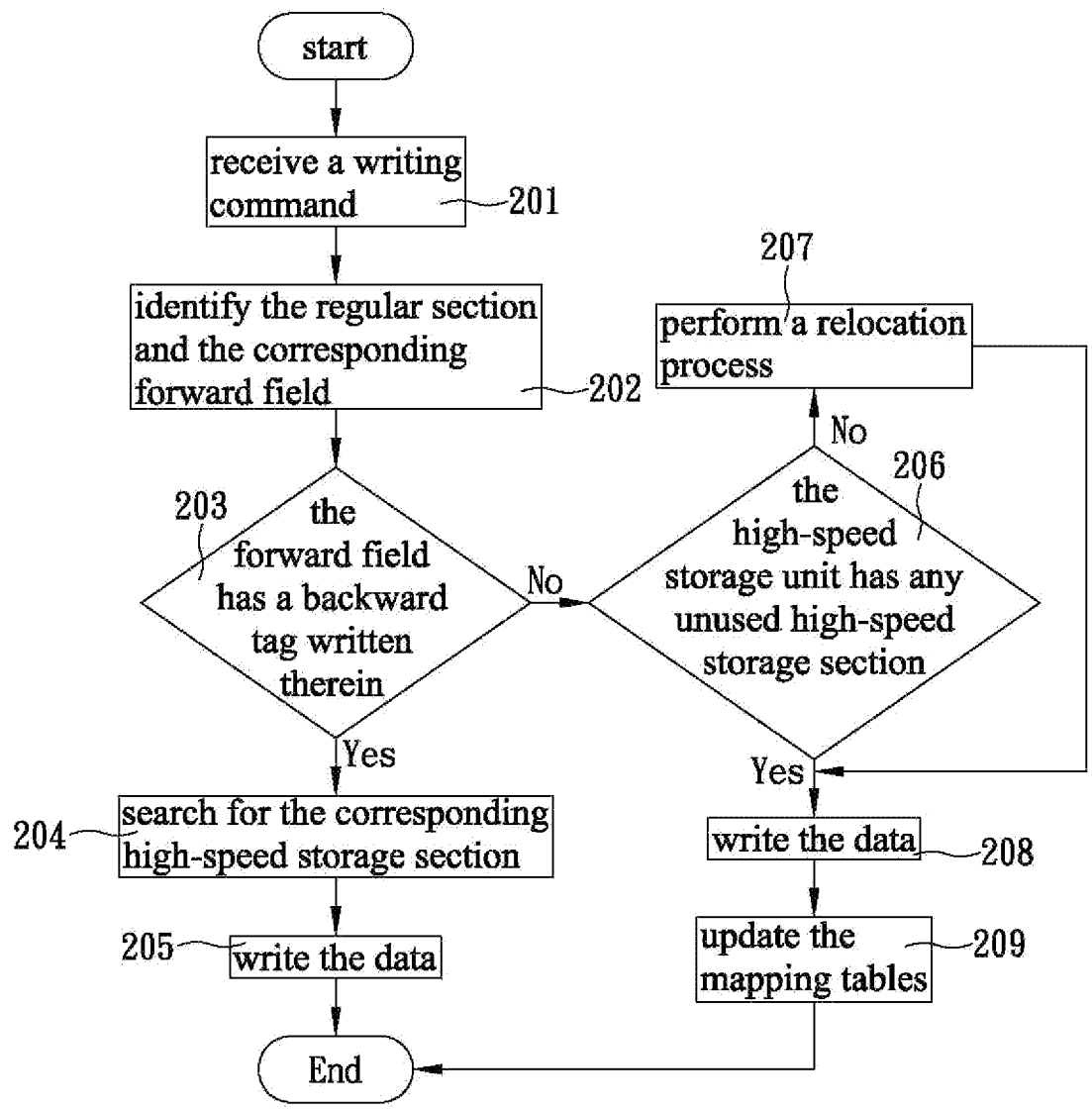
FIG. 2A is the flowchart of the writing process according to the first preferred embodiment of the present invention.

Reference is now made to FIG. 2A in conjunction with FIG. 1. When the computer 10 is to write data into the regular sections M, the computer 10 sends a writing command to the cache controller 12. Alternatively, when the computer 10 is to read the data stored in the regular sections M, the computer 10 sends a reading command to the cache controller 12. In either case, the cache controller 12 is instructed to perform a corresponding process. More specifically, the method of the present invention for increasing the read and write speeds of a hybrid storage unit is such that the cache controller 12 can perform a writing process, a reading process, and a mirroring process separately. The writing process includes the steps of:

(201) receiving a writing command from the computer 10;

(202) identifying, according to the writing command, the at least one regular section M into which data are to be written, and searching for the corresponding at least one forward field m according to the forward mapping table 101;

(203) determining whether each of the at least one forward field m already has a backward tag written therein, and executing step (204) if yes or step (206) if otherwise;

(204) searching, according to the at least one backward tag, for the corresponding at least one backward field n and the corresponding at least one high-speed storage section N;

(205) writing the data into the at least one high-speed storage section N;

(206) determining whether the high-speed storage unit 112 has any unused high-speed storage section N, and executing step (208) if yes or step (207) if otherwise;

(207) performing a relocation process to relocate the data in at least one high-speed storage section N to the corresponding at least one regular section M in the regular storage unit 110;

(208) writing the data into the unused high-speed storage section(s) N in the high-speed storage unit 112; and (209) updating the backward tag in each forward field m of the forward mapping table 101 that corresponds to one of the at least one regular section M (i.e., the at least one regular section M into which the computer 10 is to write the data), and updating the forward tag in each backward field n of the backward mapping table 102 that corresponds to one of the at least one high-speed storage section N (i.e., the at least one high-speed storage section N into which the data are actually written).

Figure 2B:
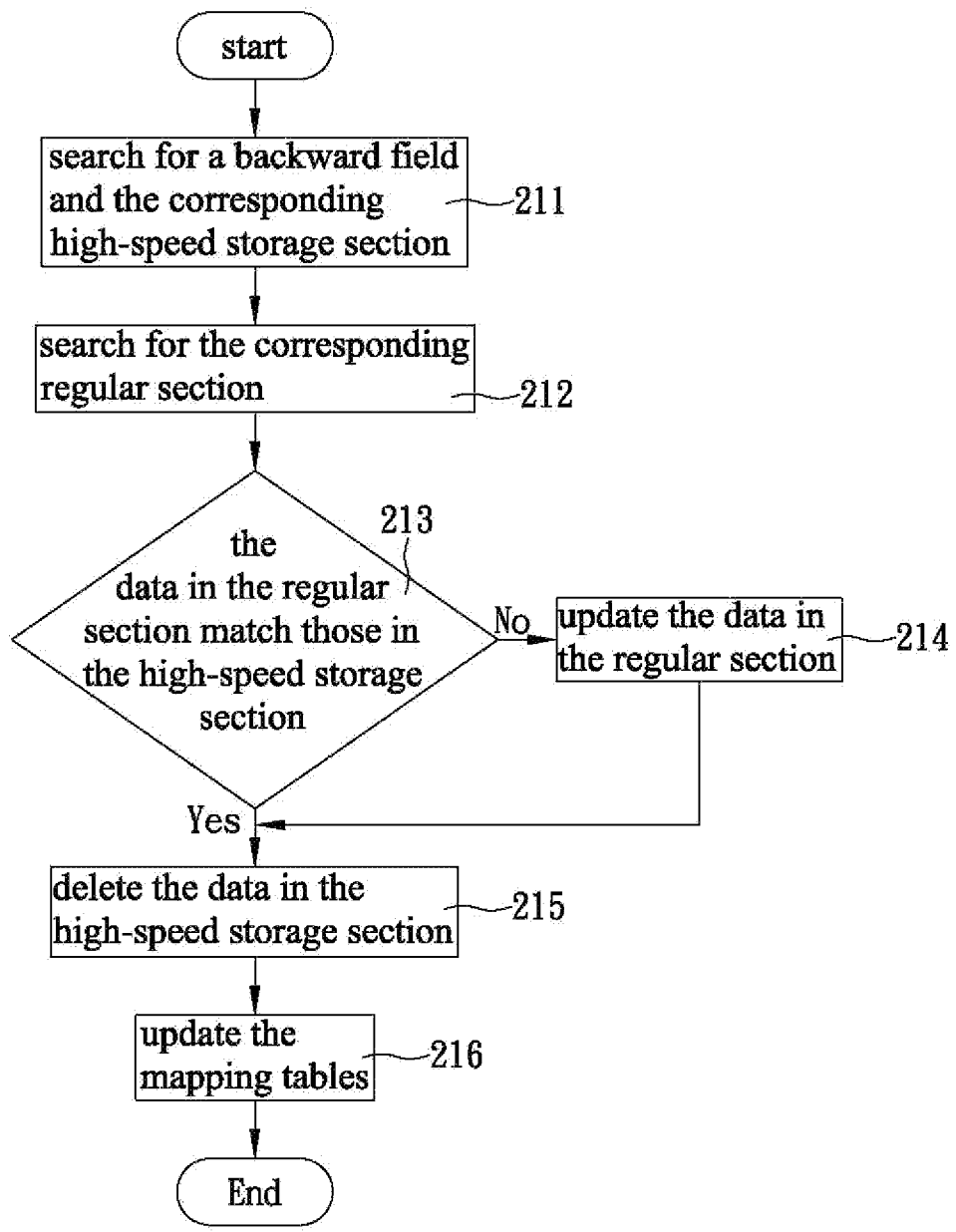
FIG. 2B is the flowchart of the relocation process according to the first preferred embodiment of the present invention.

Referring to FIG. 2B in conjunction with FIG. 1, the aforesaid relocation process includes the steps, performed by the cache controller 12 according to the mapping tables 101 and 102, of:

(211) searching for at least one backward field n and the corresponding at least one high-speed storage section N according to the backward mapping table 102;

(212) searching, according to the forward tag written in each of the at least one backward field n, for the corresponding at least one forward field m and the corresponding at least one regular section M;

(213) determining whether the data in each of the at least one regular section M match the data in the corresponding one of the at least one high-speed storage section N, and executing step (215) if yes or step (214) if otherwise;

(214) updating the data in any of the at least one regular section M whose data do not match those in the corresponding high-speed storage section N, with the data in the corresponding high-speed storage data N;

(215) deleting the data in any of the at least one high-speed storage section N whose data match those in the corresponding regular section N; and (216) clearing the backward tag in each forward field m of the forward mapping table 101 that corresponds to a regular section M the data of whose corresponding high-speed storage section N have been deleted, and clearing the forward tag in each backward field n of the backward mapping table 102 that corresponds to a high-speed storage section N whose data have been deleted.

Thus, when the computer 10 is to write data into the regular storage unit 110, the cache controller 12 will write the data into the high-speed storage unit 112 first, thereby increasing the operating efficiency of the system 1.

Figure 3:
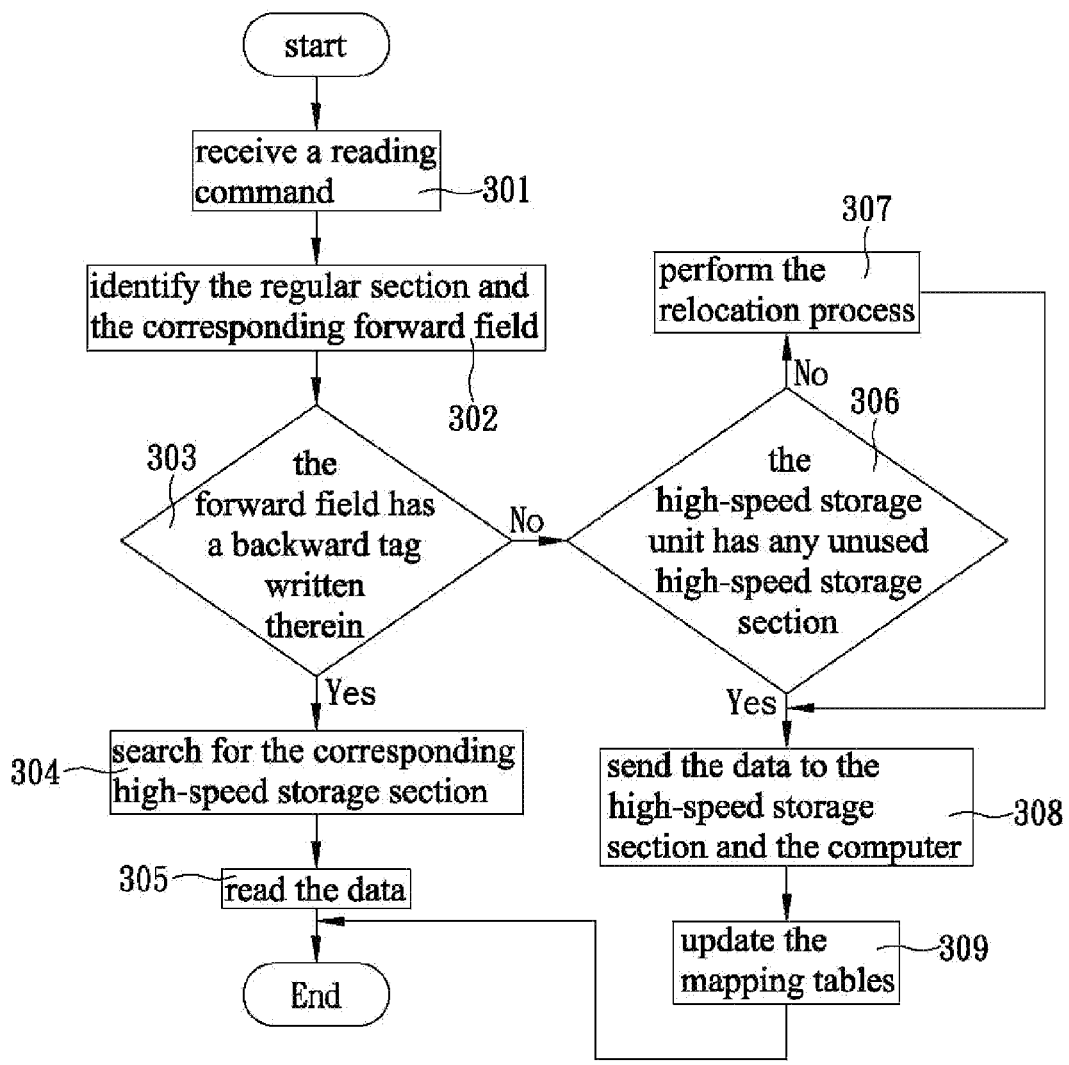
FIG. 3 is the flowchart of the reading process according to the first preferred embodiment of the present invention.

Referring to FIG. 3 in conjunction with FIG. 1, the reading process includes the steps of:

(301) receiving a reading command from the computer 10;

(302) identifying, according to the reading command, the at least one regular section M from which the computer 10 is to read data, and searching for the corresponding at least one forward field m according to the forward mapping table 101;

(303) determining whether each of the at least one forward field m already has a backward tag written therein, and executing step (304) if yes or step (306) if otherwise;

(304) searching, according to the at least one backward tag, for the corresponding at least one backward field n and the corresponding at least one high-speed storage section N;

(305) reading the data in the at least one high-speed storage section N and sending the data to the computer 10;

(306) determining whether the high-speed storage unit 112 has any unused high-speed storage section N, and executing step (308) if yes or step (307) if otherwise;

(307) performing the relocation process to relocate the data in at least one high-speed storage section N to the corresponding at least one regular section M in the regular storage unit 110;

(308) sending the data in the at least one regular section M from which the computer 10 is to read data to the computer 10 and the high-speed storage unit 112 simultaneously, and writing the data into the unused high-speed storage section(s) N; and (309) updating the backward tag in each forward field m of the forward mapping table 101 that corresponds to one of the at least one regular section M (i.e., the at least one regular section M from which the computer 10 is to read data), and updating the forward tag in each backward field n of the backward mapping table 102 that corresponds to one of the at least one high-speed storage section N (i.e., the at least one high-speed storage section N which has received the data in the at least one regular section M).

The relocation process in the reading process is identical to that in the writing process and therefore will not be described repeatedly.

Figure 4:
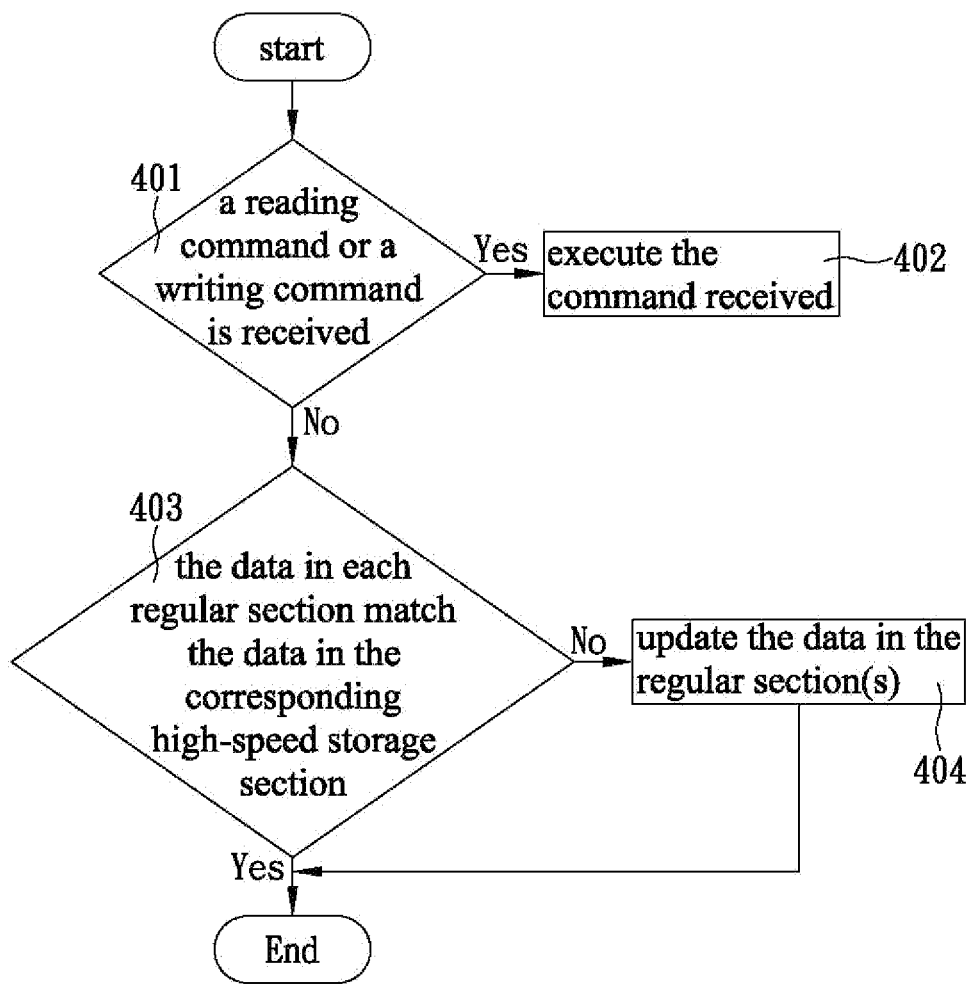
FIG. 4 is the flowchart of the mirroring process according to the first preferred embodiment of the present invention.

Referring to FIG. 4 in conjunction with FIG. 1, the mirroring process includes the steps of:

(401) determining whether a reading command or a writing command is received, and executing step (402) if yes or step (403) if otherwise;

(402) executing the command received;

(403) determining, according to the backward mapping table 102, whether the data in each regular section M match the data in the corresponding high-speed storage section N, and terminating the mirroring process if yes or executing step (404) if otherwise; and (404) mirroring the data stored in a high-speed storage section N to the corresponding regular section M if it is determined that the data respectively stored in these two sections do not match, thereby updating the data in the regular section M; and updating the contents of the mapping tables 101 and 102.

Figure 5:
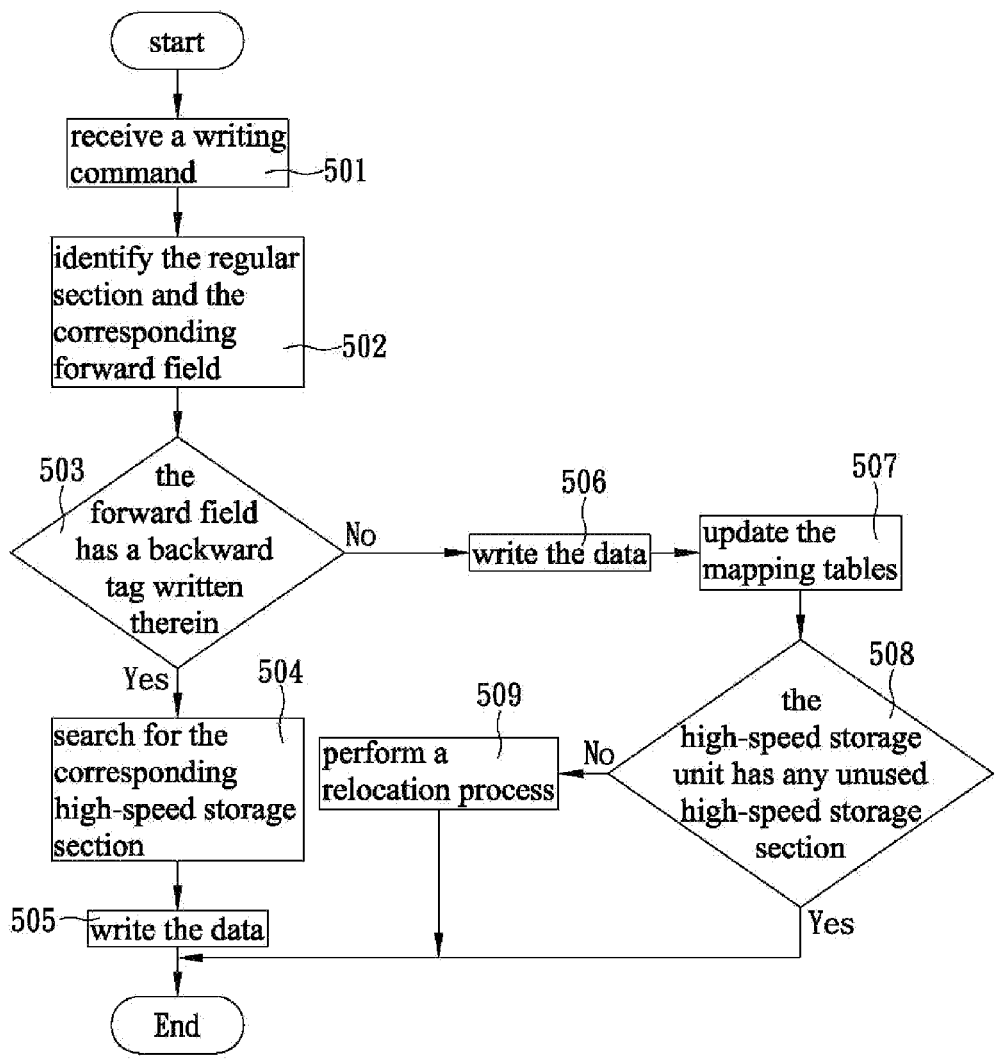
FIG. 5 is the flowchart of the writing process according to the second preferred embodiment of the present invention.

Reference is now made to FIG. 1. In the first preferred embodiment of the present invention, if a forward field m in question does not have a backward tag written therein, the cache controller 12 will not perform the data writing or reading process until it is determined whether the high-speed storage unit 112 has any unused high-speed storage section N. In the second preferred embodiment of the present invention, however, the cache controller 12 can complete the data writing or reading process and then determine whether the high-speed storage unit 112 has any unused high-speed storage section N. The latter approach is to ensure that, each time the cache controller 12 completes the writing or reading process, the high-speed storage unit 112 will be brought into a state in which it has at least one unused high-speed storage section N. Referring to FIG. 5 in conjunction with FIG. 1, the writing process in the second preferred embodiment of the present invention includes the steps of:

(501) receiving a writing command from the computer 10;

(502) identifying, according to the writing command, the at least one regular section M into which data are to be written, and searching for the corresponding at least one forward field m according to the forward mapping table 101;

(503) determining whether each of the at least one forward field m already has a backward tag written therein, and executing step (504) if yes or step (506) if otherwise;

(504) searching, according to the at least one backward tag, for the corresponding at least one backward field n and the corresponding at least one high-speed storage section N;

(505) writing the data into the at least one high-speed storage section N;

(506) writing the data into at least one unused high-speed storage section N in the high-speed storage unit 112;

(507) updating the backward tag in each forward field m of the forward mapping table 101 that corresponds to one of the at least one regular section M (i.e., the at least one regular section M into which the computer 10 is to write the data), and updating the forward tag in each backward field n of the backward mapping table 102 that corresponds to one of the at least one high-speed storage section N (i.e., the at least one high-speed storage section N into which the data are actually written);

(508) determining whether the high-speed storage unit 112 has any unused high-speed storage section N, and terminating the writing process if yes or executing step (509) if otherwise; and (509) performing a relocation process to relocate the data in at least one high-speed storage section N to the corresponding at least one regular section M in the regular storage unit 110, and terminating the writing process.

Figure 6:
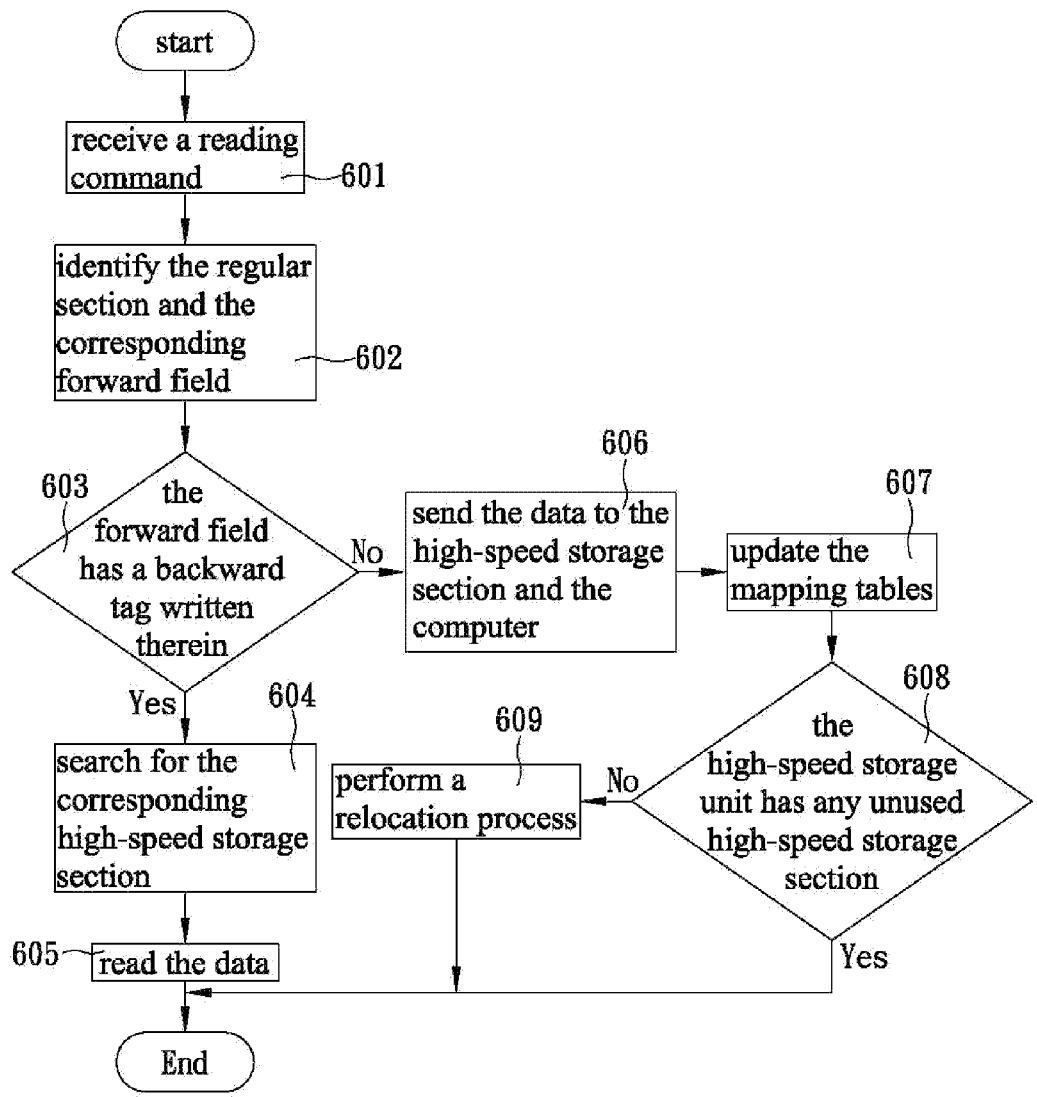
FIG. 6 is the flowchart of the reading process according to the second preferred embodiment of the present invention.

Referring to FIG. 6 in conjunction with FIG. 1, the reading process in the second preferred embodiment of the present invention includes the steps of:

(601) receiving a reading command from the computer 10;

(602) identifying, according to the reading command, the at least one regular section M from which the computer 10 is to read data, and searching for the corresponding at least one forward field m according to the forward mapping table 101;

(603) determining whether each of the at least one forward field m already has a backward tag written therein, and executing step (604) if yes or step (606) if otherwise;

(604) searching, according to the at least one backward tag, for the corresponding at least one backward field n and the corresponding at least one high-speed storage section N;

(605) reading the data in the at least one high-speed storage section N and sending the data to the computer 10;

(606) sending the data in the at least one regular section M from which the computer 10 is to read data to the computer 10 and the high-speed storage unit 112 simultaneously, and writing the data into at least one unused high-speed storage section N;

(607) updating the backward tag in each forward field m of the forward mapping table 101 that corresponds to one of the at least one regular section M (i.e., the at least one regular section M from which the computer 10 is to read data), and updating the forward tag in each backward field n of the backward mapping table 102 that corresponds to one of the at least one high-speed storage section N (i.e., the at least one high-speed storage section N which has received the data in the at least one regular section M);

(608) determining whether the high-speed storage unit 112 has any unused high-speed storage section N, and terminating the reading process if yes or executing step (609) if otherwise; and (609) performing a relocation process to relocate the data in at least one high-speed storage section N to the corresponding at least one regular section M in the regular storage unit 110, and terminating the reading process.

Referring again to FIG. 1, it is also feasible to add at least one flag t to the backward mapping table 102, wherein each flag t points to the backward field n corresponding to a high-speed storage section N whose data are written the earliest. Thus, when performing the relocation process, the cache controller 12 can delete, before all else, the data in the high-speed storage section(s) N corresponding to the backward field(s) n indicated by the at least one flag t. Alternatively, each flag t can point to the backward field n corresponding to a high-speed storage section N whose data are written the latest. This is to prevent the cache controller 12 from deleting any recently written data during the relocation process. This is desirable because, should any recently written data be deleted, the same data will have to be read again, which compromises the efficiency of the computer 10. As the at least one flag t is an indicator for reference by the cache controller 12 when searching the backward mapping table 102, the type of fields to which the at least one flag t points can be set as needed, such as, without limitation, the backward fields n corresponding to the least frequently used (LFU) high-speed storage sections N or the backward fields n corresponding to the least recently used (LRU) high-speed storage sections N.

It should be pointed out that although the hybrid storage unit 11 and the cache controller 12 in the first preferred embodiment of the present invention are both installed in the computer 10 as shown in FIG. 1, the hybrid storage unit 11 and the cache controller 12 in another preferred embodiment of the present invention may be installed in a different way. For example, the hybrid storage unit 11 may be provided externally (i.e., either the regular storage unit 110 or the high-speed storage unit 112 being an external drive) and then electrically connected to the computer 10. Alternatively, the cache controller 12 may be built-in on the motherboard (not shown) of the computer 10 and integrated with a south bridge circuit 14 in the computer 10 such that the south bridge circuit 14 can control the hybrid storage unit 11 via the cache controller 12. In either case, the speed at which and the efficiency with which the system 1 reads data from and writes data into the hybrid storage unit 11 can be increased just as in the first preferred embodiment of the present invention.

In addition, while the mapping tables 101 and 102 in the first preferred embodiment of the present invention are stored and set in the system 1, the mapping tables 101 and 102 in another preferred embodiment of the present invention may be generated automatically by the system 1 through an identification process. For instance, the cache controller 12 can identify the product information (e.g., capacities, specifications, etc.) of the regular storage unit 110 and of the high-speed storage unit 112, generate the mapping tables 101 and 102 according to the product information, and store the mapping tables 101 and 102 into the computer 10. Such a configuration increases the flexibility of application of the system 1 significantly.

Figure 7:
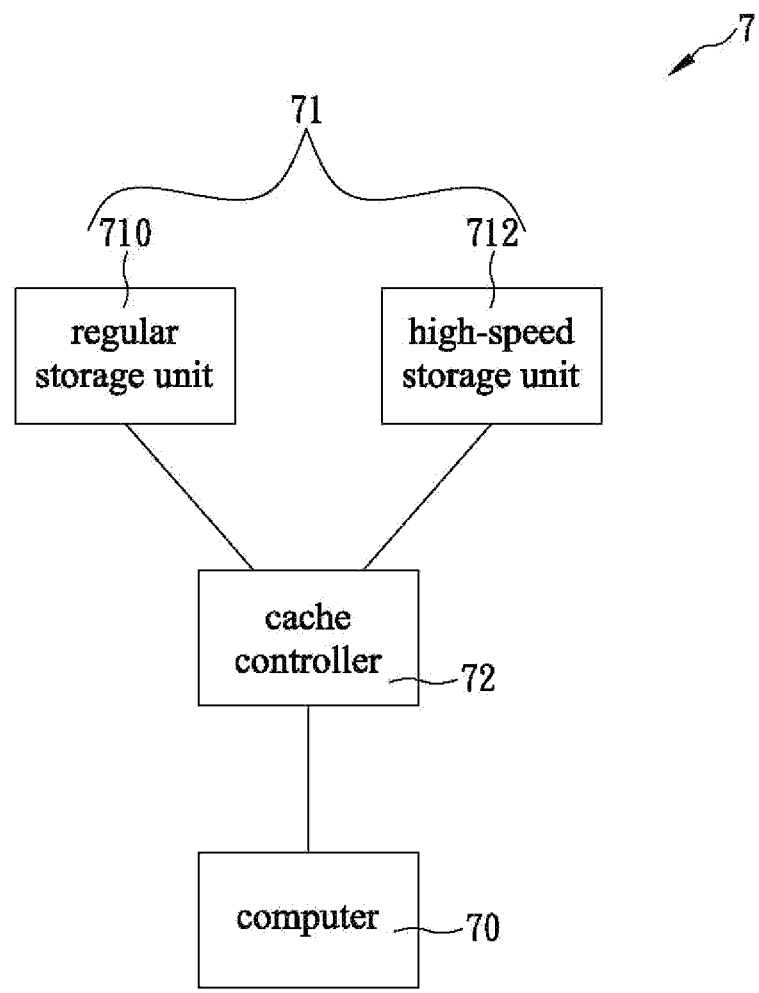
FIG. 7 is a schematic drawing of the system according to the second preferred embodiment of the present invention.

FIG. 7 shows a system 7 for increasing the read and write speeds of a hybrid storage unit according to the second preferred embodiment of the present invention. In this embodiment, the computer 70, the regular storage unit 710, the high-speed storage unit 712, and the cache controller 72 are components independent of one another, and the cache controller 72 is respectively and electrically connected to the computer 70 and the hybrid storage unit 71 (i.e., the regular storage unit 710 and the high-speed storage unit 712) so as for the computer 70 to take advantage of the cache controller 72 and thereby increase the processing speed of the hybrid storage unit 71 in data reading or data writing.

In the foregoing embodiments, the system for increasing the read and write speeds of a hybrid storage unit includes one regular storage unit and one high-speed storage unit. In another embodiment of the present invention, however, the system may include a plurality of regular storage units or a plurality of high-speed storage units. For example, the system may include a first regular storage unit, a second regular storage unit, and a high-speed storage unit. As long as the forward mapping tables of the regular storage units and the backward mapping table of the high-speed storage unit correspond to one another, the system can use the high-speed storage unit to boost the read and write speeds of both regular storage units. By the same token, the system may also include a plurality of high-speed storage units and one regular storage unit. For instance, the system may include a regular storage unit, a first high-speed storage unit, and a second high-speed storage unit. Provided that the storage units can cooperate with one another (e.g., with the second high-speed storage unit having higher read and write speeds than the regular storage unit and serving to accelerate the regular storage unit, and the first high-speed storage unit having higher read and write speeds than the second high-speed storage unit and serving to accelerate the second high-speed storage unit), the read and write speeds of the storage units will be further enhanced.

Figure 8A:
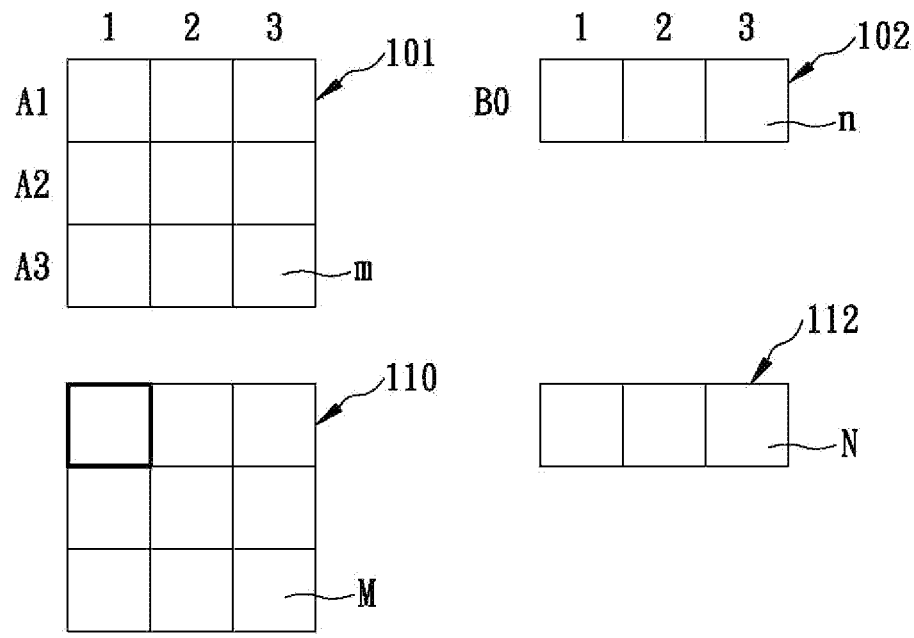
FIGS. 8A~8C show consecutive steps in the first preferred embodiment of the present invention.
Figure 8B:
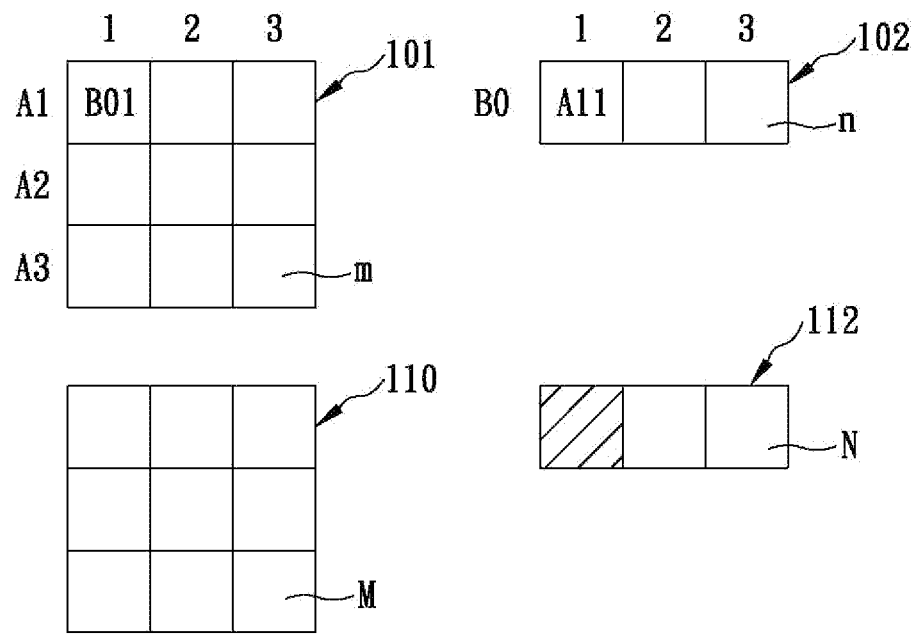
Figure 8C:
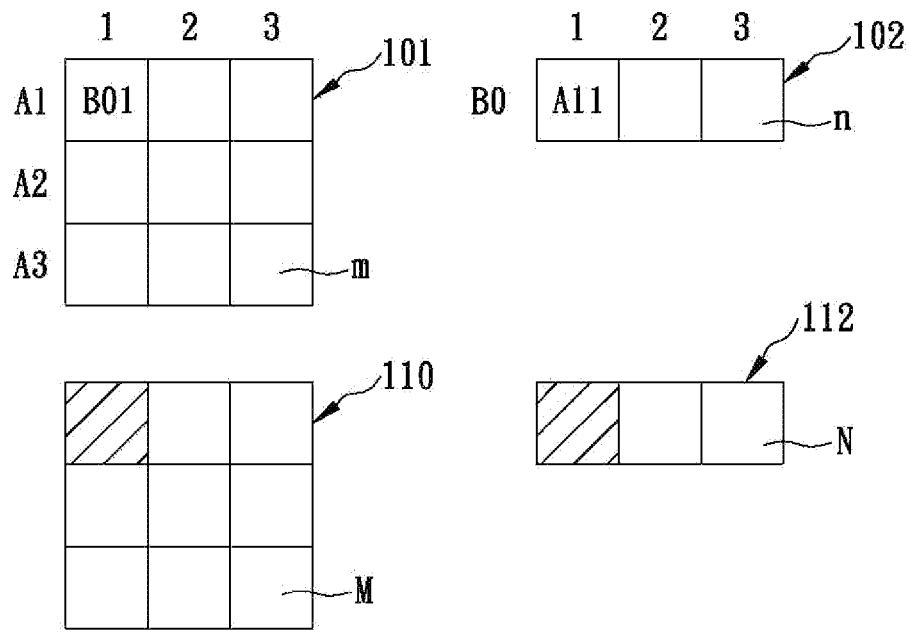

To clearly demonstrate the operation of the system and method of the present invention for increasing the read and write speeds of a hybrid storage unit, the writing process is now described in a step-by-step manner in relation to the mapping tables 101 and 102 and with reference to FIGS. 8A~8C in conjunction with FIG. 1, wherein FIGS. 8A~8C show how the computer 10 writes data into a regular section M. On the left of FIG. 8A are the forward mapping table 101 and the corresponding regular storage unit 110, while on the right of FIG. 8A are the backward mapping table 102 and the corresponding high-speed storage unit 112. The regular section M into which the computer 10 is to write data is indicated by a thick black frame. As the forward field m corresponding to this regular section M (i.e., the forward field m corresponding to the forward tag A11) does not have a backward tag written therein, the cache controller 12 writes the data into any unused high-speed storage section N in the high-speed storage unit 112.

Referring to FIG. 8B in conjunction with FIG. 1, once the cache controller 12 writes the data into a high-speed storage section N, the mapping tables are updated such that the forward field m corresponding to the regular section M is filled with the corresponding tag (i.e., B01) and the backward field n corresponding to the high-speed storage section N is filled with the corresponding tag (i.e., A11). Then, referring to FIG. 8C, the cache controller 12, when not receiving a further writing command or reading command, mirrors the data in the high-speed storage section N to the regular section M. Consequently, the data is stored in the regular section M intended by the computer 10.

Figure 9A:
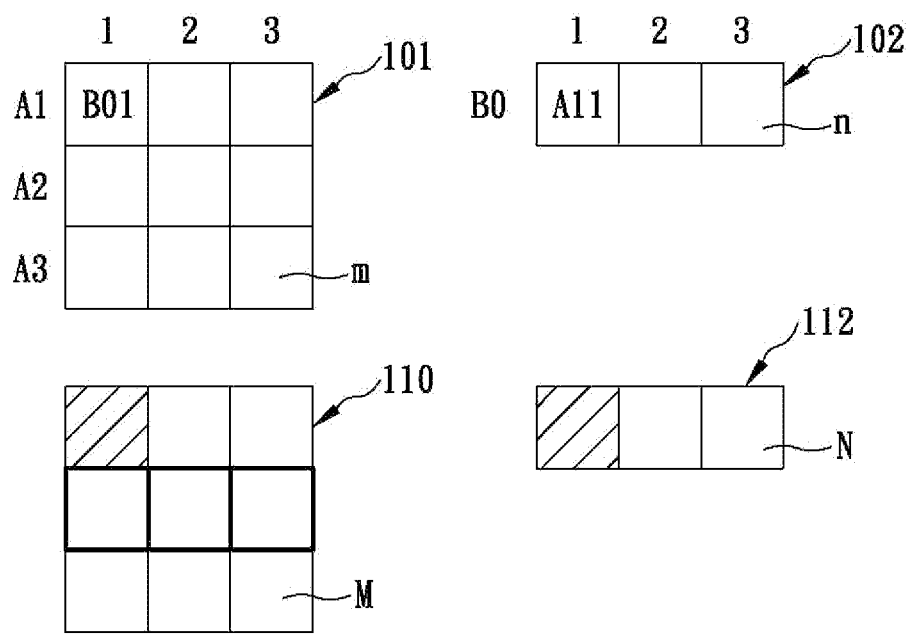
FIGS. 9A~9E show consecutive steps in the first preferred embodiment of the present invention.
Figure 9B:
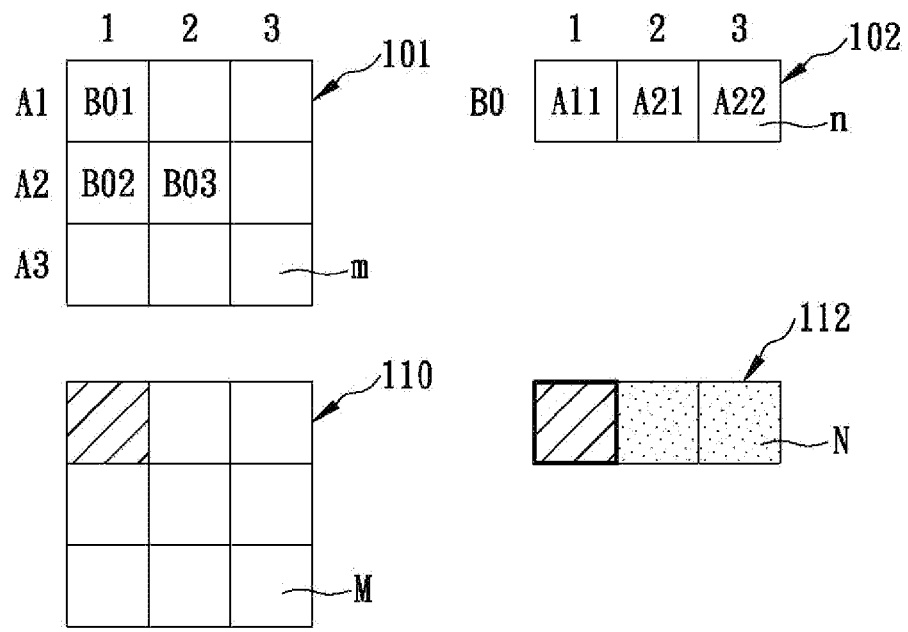
Figure 9C:
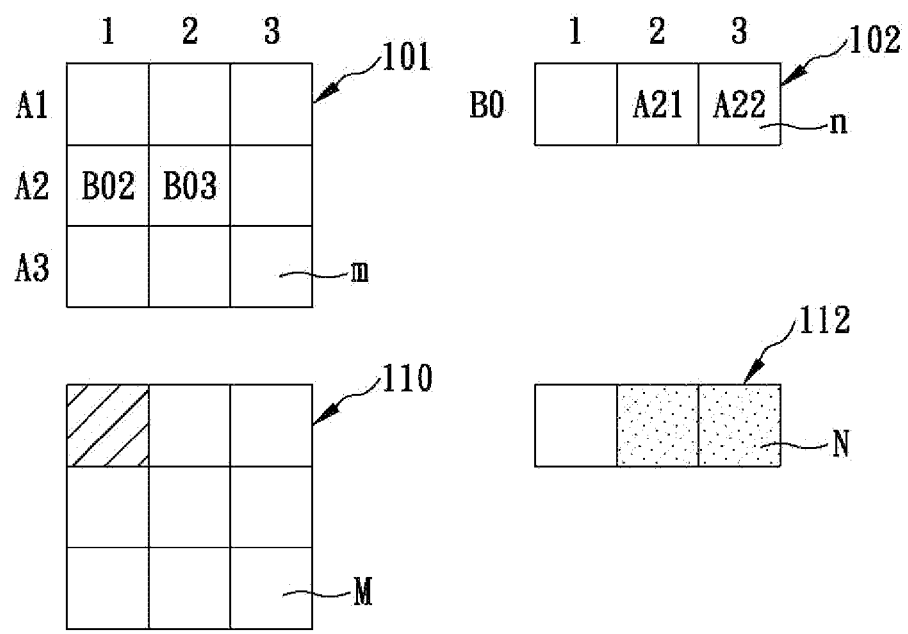
Figure 9D:
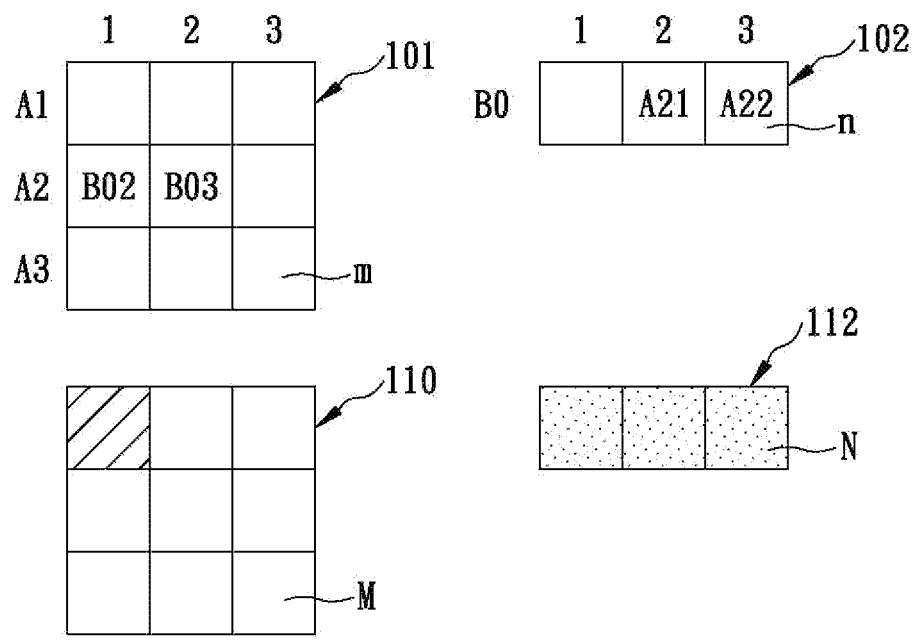
Figure 9E:
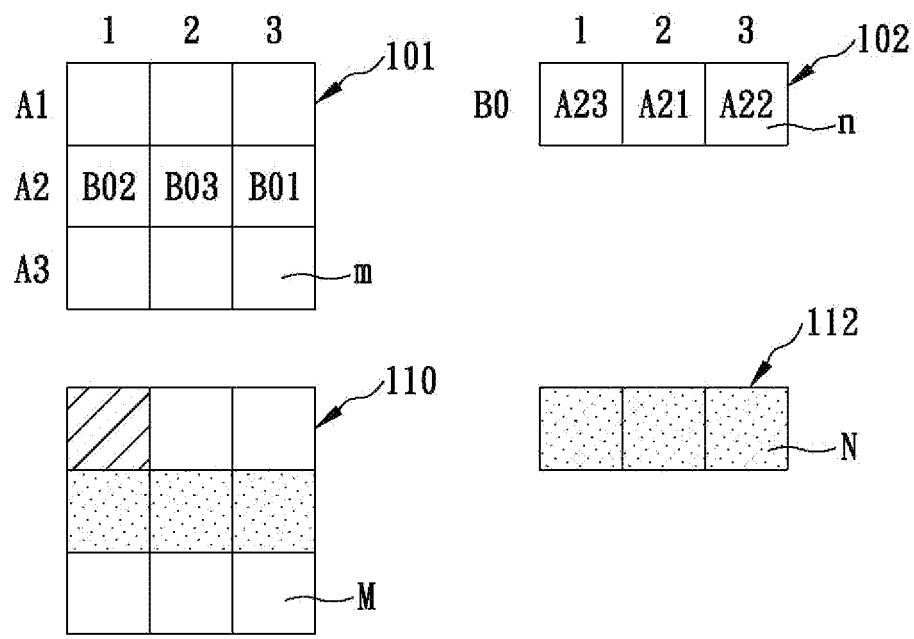

Referring to FIG. 9A in conjunction with FIG. 1, the computer 10 is now ready to write plural entries of data (hereinafter referred to the second data) into three regular sections M (each indicated by a thick black frame) respectively. Since none of the forward fields m corresponding to the regular sections M has a backward tag written therein, the cache controller 12 writes a portion of the second data into some unused high-speed storage sections N in the high-speed storage unit 112, as shown in FIG. 9B. After that, the cache controller 12 performs the relocation process and determines whether the data stored in at least one high-speed storage section N in the high-speed storage unit 112 (e.g., the high-speed storage section N with a thick black frame in FIG. 9B) match the data in the corresponding at least one regular section M. As the data in the regular section M corresponding to the high-speed storage section N with the thick black frame in FIG. 9B has been updated by the mirroring process shown in FIG. 8C, the cache controller 12 simply deletes the data in this high-speed storage section N, updates the corresponding tags in the mapping tables, and thus completes the relocation process. As a result, a used high-speed storage section N is freed, as shown in FIG. 9C. Then, the cache controller 12 writes the remaining entry of the second data into the empty high-speed storage section N, as shown in FIG. 9D. Last but not least, referring to FIG. 9E, the cache controller 12 updates the tags in the mapping tables and the data in the regular sections M, so as to store the second data into the regular sections M intended by the computer 10.

Figure 10A:
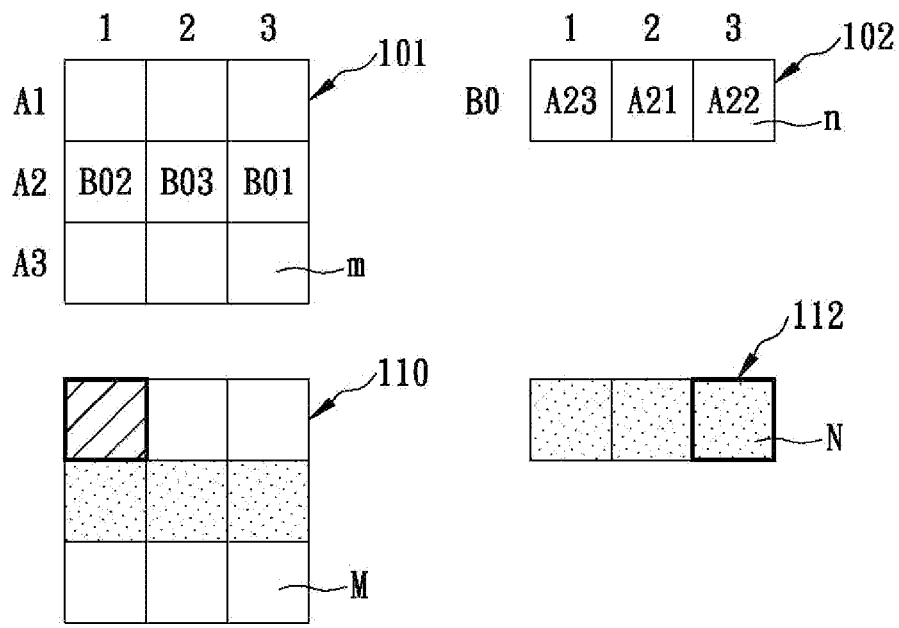
FIGS. 10A~10C show consecutive steps in the first preferred embodiment of the present invention.
Figure 10B:
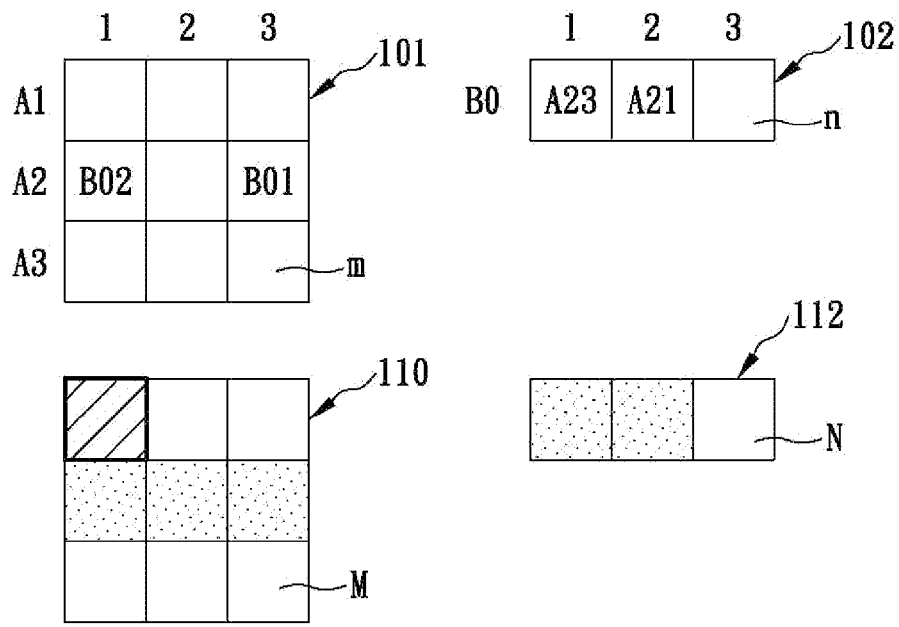
Figure 10C:
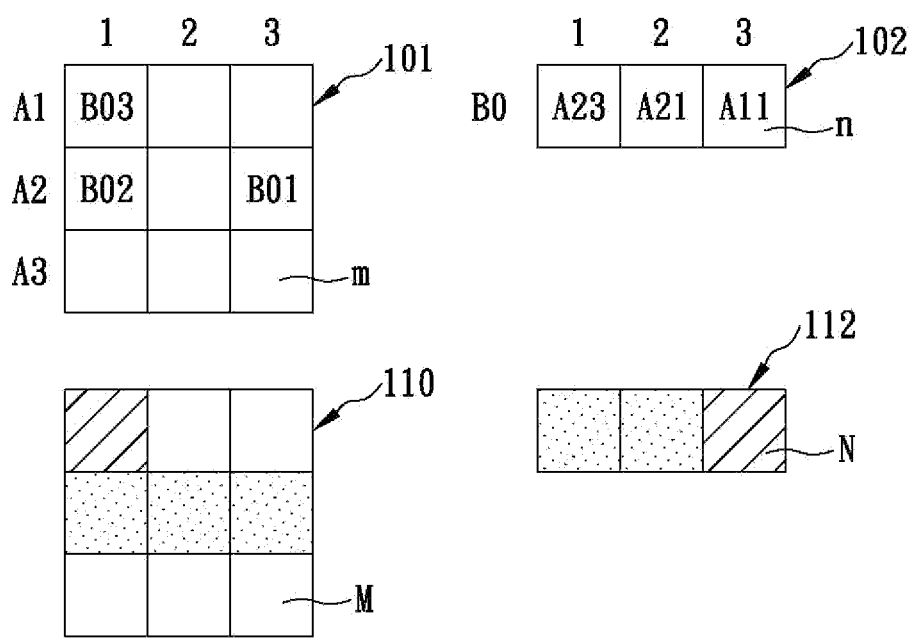

Referring to FIG. 10A in conjunction with FIG. 1, the computer 10 is now ready to read the data in a certain regular section M (e.g., the regular section M in the regular storage unit 110 in FIG. 10A that is indicated by a thick black frame). As the forward field m corresponding to the regular section M does not have any backward tag written therein, meaning the high-speed storage unit 112 does not have a corresponding high-speed storage section N, the cache controller 12 begins by performing the relocation process in order to relocate the data in a high-speed storage section N (e.g., the high-speed storage section N in the high-speed storage unit 112 in FIG. 10A that is indicated by a thick black frame) to the regular storage unit 110. Referring to FIG. 10B, the cache controller 12 searches for the corresponding regular section M in accordance with the forward tag written in the backward field n corresponding to the high-speed storage section N with the thick black frame in FIG. 10A and, after determining that the data in the regular section M match the data in the high-speed storage section N, empties the high-speed storage section N. Referring to FIG. 10C, once the data in the high-speed storage section N are deleted, the cache controller 12 sends the data in the regular section M with the thick black frame in FIG. 10A to the computer 10 and the high-speed storage section N at the same time. Thus, when the computer 10 subsequently needs to read the data in the regular section M with the thick black frame in FIG. 10A again, the cache controller 12 can read the same data directly from the high-speed storage section N.

While the invention herein disclosed has been described by means of specific embodiments, numerous modifications and variations could be made thereto by those skilled in the art without departing from the scope of the invention set forth in the claims.

What is claimed is:

1. A system for increasing read and write speeds of a hybrid storage unit, the system comprising:
    a computer storing a forward mapping table and a backward mapping table, wherein the forward mapping table includes a plurality of forward fields, and the backward mapping table includes a plurality of backward fields;
    at least a regular storage unit electrically connected to the computer, wherein the at least a regular storage unit is divided into a plurality of regular sections corresponding respectively to the forward fields;
    at least a high-speed storage unit having a higher read speed and a higher write speed than the at least a regular storage unit and electrically connected to the computer, wherein the at least a high-speed storage unit is divided into a plurality of high-speed storage sections corresponding respectively to the backward fields; and
    a cache controller respectively and electrically connected to the computer, the at least a regular storage unit, and the at least a high-speed storage unit, wherein the cache controller can either write a backward tag into each said forward field to make each said forward field correspond to a said backward field and thereby make the regular section corresponding to each said forward field correspond to the high-speed storage section corresponding to a corresponding said backward field, or write a forward tag into each said backward field to make each said backward field correspond to a said forward field and thereby make the high-speed storage section corresponding to each said backward field correspond to the regular section corresponding to a corresponding said forward field.

2. The system of claim 1, wherein upon receiving a writing command, the cache controller identifies, according to the writing command, at least a said regular section into which data are to be written; and if each said forward field in the forward mapping table that corresponds to one of the at least a regular section already has a said backward tag written therein, the cache controller searches, according to the at least a backward tag, for corresponding at least a said high-speed storage section and writes the data into the at least a high-speed storage section; otherwise, the cache controller writes the data into at least an unused one of the high-speed storage sections in the at least a high-speed storage unit, updates a said backward tag in each said forward field of the forward mapping table that corresponds to one of the at least a regular section, and updates a said forward tag in each said backward field of the backward mapping table that corresponds to one of the at least an unused one of the high-speed storage sections.

3. The system of claim 2, wherein upon receiving a reading command, the cache controller identifies, according to the reading command, at least a said regular section from which the computer is to read; and if each said forward field in the forward mapping table that corresponds to one of the at least a regular section already has a said backward tag written therein, the cache controller searches, according to the at least a backward tag, for corresponding at least a said high-speed storage section and reads data in the at least a high-speed storage section; otherwise, the cache controller sends data in the at least a regular section to the computer and at least an unused one of the high-speed storage sections in the at least a high-speed storage unit simultaneously, updates a said backward tag in each said forward field of the forward mapping table that corresponds to one of the at least a regular section, and updates a said forward tag in each said backward field of the backward mapping table that corresponds to one of the at least an unused one of the high-speed storage sections.

4. The system of claim 3, wherein when the cache controller does not receive a said reading command or a said writing command, and if the cache controller determines that data stored in a said regular section do not match data stored in a corresponding said high-speed storage section, the cache controller mirrors to the regular section the data stored in the corresponding high-speed storage section.

5. A system for increasing read and write speeds of a hybrid storage unit, the system comprising at least a regular storage unit, at least a high-speed storage unit, and a cache controller, the system storing a forward mapping table and a backward mapping table, wherein the forward mapping table and the backward mapping table can be stored in any device or devices in the system, the forward mapping table including a plurality of forward fields, the backward mapping table including a plurality of backward fields, the at least a regular storage unit being divided into a plurality of regular sections corresponding respectively to the forward fields, the at least a high-speed storage unit having a higher read speed and a higher write speed than the at least a regular storage unit and being divided into a plurality of high-speed storage sections corresponding respectively to the backward fields, the cache controller being respectively and electrically connected to the at least a regular storage unit, the at least a high-speed storage unit, and a computer, wherein the cache controller can either write a backward tag into each said forward field to make each said forward field correspond to a said backward field and thereby make the regular section corresponding to each said forward field correspond to the high-speed storage section corresponding to a corresponding said backward field, or write a forward tag into each said backward field to make each said backward field correspond to a said forward field and thereby make the high-speed storage section corresponding to each said backward field correspond to the regular section corresponding to a corresponding said forward field.

6. The system of claim 5, wherein upon receiving a writing command, the cache controller identifies, according to the writing command, at least a said regular section into which data are to be written; and if each said forward field in the forward mapping table that corresponds to one of the at least a regular section already has a said backward tag written therein, the cache controller searches, according to the at least a backward tag, for corresponding at least a said high-speed storage section and writes the data into the at least a high-speed storage section; otherwise, the cache controller writes the data into at least an unused one of the high-speed storage sections in the at least a high-speed storage unit, updates a said backward tag in each said forward field of the forward mapping table that corresponds to one of the at least a regular section, and updates a said forward tag in each said backward field of the backward mapping table that corresponds to one of the at least an unused one of the high-speed storage sections.

7. The system of claim 6, wherein upon receiving a reading command, the cache controller identifies, according to the reading command, at least a said regular section from which the computer is to read; and if each said forward field in the forward mapping table that corresponds to one of the at least a regular section already has a said backward tag written therein, the cache controller searches, according to the at least a backward tag, for corresponding at least a said high-speed storage section and reads data in the at least a high-speed storage section; otherwise, the cache controller sends data in the at least a regular section to the computer and at least an unused one of the high-speed storage sections in the at least a high-speed storage unit simultaneously, updates a said backward tag in each said forward field of the forward mapping table that corresponds to one of the at least a regular section, and updates a said forward tag in each said backward field of the backward mapping table that corresponds to one of the at least an unused one of the high-speed storage sections.

8. The system of claim 7, wherein when the cache controller does not receive a said reading command or a said writing command, and if the cache controller determines that data stored in a said regular section do not match data stored in a corresponding said high-speed storage section, the cache controller mirrors to the regular section the data stored in the corresponding high-speed storage section.

9. A method for increasing read and write speeds of a hybrid storage unit, the method being applicable to a system, the system comprising a computer, a hybrid storage unit, and a cache controller, the system storing a forward mapping table and a backward mapping table, wherein the forward mapping table and the backward mapping table can be stored in any device or devices in the system, the hybrid storage unit being composed of at least a regular storage unit and at least a high-speed storage unit, the at least a high-speed storage unit having a higher read speed and a higher write speed than the at least a regular storage unit, the at least a regular storage unit being divided into a plurality of regular sections, the at least a high-speed storage unit being divided into a plurality of high-speed storage sections, the forward mapping table including a plurality of forward fields corresponding respectively to the regular sections, the backward mapping table including a plurality of backward fields corresponding respectively to the high-speed storage sections, wherein each said forward field can have a backward tag written therein so as to correspond to a said backward field, thereby making the regular section corresponding to each said forward field correspond to the high-speed storage section corresponding to a corresponding said backward field; or each said backward field can have a forward tag written therein so as to correspond to a said forward field, thereby making the high-speed storage section corresponding to each said backward field correspond to the regular section corresponding to a corresponding said forward field, the cache controller being respectively and electrically connected to the computer, the at least a regular storage unit, and the at least a high-speed storage unit, the computer being configured for sending a writing command to the cache controller when the computer is to write data into the regular sections, the method comprising a writing process which is performed by the cache controller and comprises the steps of:

receiving the writing command;

identifying, according to the writing command, at least a said regular section into which the data are to be written;

determining whether each said forward field in the forward mapping table that corresponds to one of the at least a regular section already has a said backward tag written therein; and if it is determined that each said forward field in the forward mapping table that corresponds to one of the at least a regular section already has a said backward tag written therein, searching for corresponding at least a said high-speed storage section according to the at least a backward tag and writing the data into the at least a high-speed storage section; or if it is determined that not each said forward field in the forward mapping table that corresponds to one of the at least a regular section has a said backward tag written therein, writing the data into at least an unused one of the high-speed storage sections in the at least a high-speed storage unit, updating a said backward tag in each said forward field of the forward mapping table that corresponds to one of the at least a regular section, and updating a said forward tag in each said backward field of the backward mapping table that corresponds to one of the at least an unused one of the high-speed storage sections.

10. The method of claim 9, wherein the computer is configured for sending a reading command to the cache controller when the computer is to read data stored in the regular sections, the method further comprising a reading process which is performed by the cache controller and comprises the steps of:

receiving the reading command;

identifying, according to the reading command, at least a said regular section from which the data are to be read;

determining whether each said forward field in the forward mapping table that corresponds to one of the at least a regular section already has a said backward tag written therein; and if it is determined that each said forward field in the forward mapping table that corresponds to one of the at least a regular section already has a said backward tag written therein, searching for corresponding at least a said high-speed storage section according to the at least a backward tag and reading data in the at least a high-speed storage section; or if it is determined that not each said forward field in the forward mapping table that corresponds to one of the at least a regular section has a said backward tag written therein, reading data in the at least a regular section, sending the data to the computer and at least an unused one of the high-speed storage sections in the at least a high-speed storage unit, updating a said backward tag in each said forward field of the forward mapping table that corresponds to one of the at least a regular section, and updating a said forward tag in each said backward field of the backward mapping table that corresponds to one of the at least an unused one of the high-speed storage sections.

11. The method of claim 10, wherein the method further comprises a mirroring process performed by the cache controller and comprising the steps of:
   determining, when the cache controller does not receive a said reading command or a said writing command and according to the backward mapping table, whether data stored in each said regular section match data stored in a corresponding said high-speed storage section; and
   mirroring to a said regular section the data stored in a corresponding said high-speed storage section if it is determined that the data stored in the regular section do not match the data stored in the corresponding high-speed storage section.

12. The method of claim 11, wherein the method further comprises a relocation process performed by the cache controller if the cache controller, prior to writing data into the at least a high-speed storage unit, determines that none of the high-speed storage sections in the at least a high-speed storage unit is unused, the relocation process serving to relocate data in the at least a high-speed storage unit to a corresponding said regular section or corresponding said regular sections in the at least a regular storage unit and comprising the steps of:
   searching for at least a said backward field and corresponding at least a said high-speed storage section according to the backward mapping table;
   searching, according to a said forward tag written in each of the at least a backward field, for corresponding at least a said forward field and corresponding at least a said regular section;
   determining whether data in each of the at least a regular section match data in a corresponding one of the at least a high-speed storage section; and
   if the data in any of the at least a regular section match the data in the corresponding one of the at least a high-speed storage section, deleting the data in the corresponding one of the at least a high-speed storage section, clearing a said backward tag in one of the at least a forward field of the forward mapping table that corresponds to the regular section, and clearing the forward tag in one of the at least a backward field of the backward mapping table that corresponds to the corresponding one of the at least a high-speed storage section; or if the data in any of the at least a regular section do not match the data in the corresponding one of the at least a high-speed storage section, updating the data in the regular section with the data in the corresponding one of the at least a high-speed storage section, deleting the data in the corresponding one of the at least a high-speed storage section, clearing a said backward tag in one of the at least a forward field of the forward mapping table that corresponds to the regular section, and clearing the forward tag in one of the at least a backward field of the backward mapping table that corresponds to the corresponding one of the at least a high-speed storage section.

13. The method of claim 11, wherein the method further comprises a relocation process performed by the cache controller if the cache controller, after writing data into an unused one of the high-speed storage sections, determines that none of the high-speed storage sections in the at least a high-speed storage unit is unused, the relocation process serving to relocate data in at least a said high-speed storage section to corresponding at least a said regular section in the at least a regular storage unit, the relocation process comprising the steps of:
   searching for at least a said backward field and corresponding at least a said high-speed storage section according to the backward mapping table;
   searching, according to a said forward tag written in each of the at least a backward field, for corresponding at least a said forward field and corresponding at least a said regular section;
   determining whether data in each of the at least a regular section match data in a corresponding one of the at least a high-speed storage section; and
   if the data in any of the at least a regular section match the data in the corresponding one of the at least a high-speed storage section, deleting the data in the corresponding one of the at least a high-speed storage section, clearing a said backward tag in one of the at least a forward field of the forward mapping table that corresponds to the regular section, and clearing the forward tag in one of the at least a backward field of the backward mapping table that corresponds to the corresponding one of the at least a high-speed storage section; or if the data in any of the at least a regular section do not match the data in the corresponding one of the at least a high-speed storage section, updating the data in the regular section with the data in the corresponding one of the at least a high-speed storage section, deleting the data in the corresponding one of the at least a high-speed storage section, clearing a said backward tag in one of the at least a forward field of the forward mapping table that corresponds to the regular section, and clearing the forward tag in one of the at least a backward field of the backward mapping table that corresponds to the corresponding one of the at least a high-speed storage section.

14. The method of claim 11, wherein the backward mapping table further includes at least a flag pointing to a said high-speed storage section in the at least a high-speed storage unit such that, during the relocation process and according to the at least a flag, the cache controller preferentially deletes data in each said high-speed storage section corresponding to a said flag.

15. The method of claim 11, wherein the backward mapping table further includes at least a flag pointing to a said high-speed storage section in the at least a high-speed storage unit such that, during the relocation process and according to the at least a flag, the cache controller preferentially keeps data in each said high-speed storage section corresponding to a said flag.

* * * * *